(12) United States Patent
Setoguchi et al.

(10) Patent No.: US 8,530,049 B2
(45) Date of Patent: Sep. 10, 2013

(54) RESIN-COATED METALLIC PIGMENT COMPRISING A SURFACE MODIFIER AT A SURFACE PORTION, WATER-BASED PAINT CONTAINING THE SAME, AND METHOD OF MANUFACTURING RESIN-COATED METALLIC PIGMENT

(75) Inventors: Shunichi Setoguchi, Osaka (JP); Gaochao Lai, Osaka (JP); Yoshiki Hashizume, Osaka (JP); Kazuya Fujimoto, Osaka (JP)

(73) Assignee: Toyo Aluminium Kabushiki Kaisha, Osaka-shi (JP)

( * ) Notice: Subject to any disclaimer, the term of this patent is extended or adjusted under 35 U.S.C. 154(b) by 130 days.

(21) Appl. No.: 13/119,194

(22) PCT Filed: Sep. 8, 2009

(86) PCT No.: PCT/JP2009/065629
§ 371 (c)(1),
(2), (4) Date: Mar. 16, 2011

(87) PCT Pub. No.: WO2010/032654
PCT Pub. Date: Mar. 25, 2010

(65) Prior Publication Data
US 2011/0195244 A1    Aug. 11, 2011

(30) Foreign Application Priority Data
Sep. 17, 2008   (JP) ................. 2008-238204

(51) Int. Cl.
*B32B 5/16* (2006.01)
*C08K 3/00* (2006.01)
*C08K 3/08* (2006.01)
*C08K 3/10* (2006.01)

(52) U.S. Cl.
USPC ........... 428/407; 524/439; 524/779; 524/780; 524/781; 524/786; 524/847

(58) Field of Classification Search
USPC ................................. 428/403–407
See application file for complete search history.

(56) References Cited

U.S. PATENT DOCUMENTS

| | | | |
|---|---|---|---|
| 5,037,475 A | | 8/1991 | Chida et al. |
| 5,216,081 A | * | 6/1993 | Mohri et al. .................. 525/199 |
| 6,022,911 A | * | 2/2000 | Hashizume et al. .......... 523/213 |
| 6,177,196 B1 | * | 1/2001 | Brothers et al. .............. 428/422 |
| 8,283,397 B2 | * | 10/2012 | Terao et al. .................. 524/127 |
| 2005/0118380 A1 | | 6/2005 | Hirata et al. |
| 2006/0063004 A1 | | 3/2006 | Takano et al. |
| 2008/0081864 A1 | | 4/2008 | Takano |
| 2009/0041942 A1 | | 2/2009 | Hayashi et al. |
| 2009/0131584 A1 | | 5/2009 | Terao et al. |
| 2009/0264575 A1 | | 10/2009 | Henglein et al. |

FOREIGN PATENT DOCUMENTS

| | | |
|---|---|---|
| CN | 1774482 A | 5/2006 |
| CN | 101133128 A | 2/2008 |
| CN | 101273103 A | 9/2008 |
| EP | 1 837 380 A1 | 9/2007 |
| EP | 1 950 257 A1 | 7/2008 |
| JP | 62-81460 A | 4/1987 |
| JP | 62-253668 A | 11/1987 |
| JP | 64-40566 A | 2/1989 |
| JP | 1-129070 A | 5/1989 |
| JP | 1315470 | 12/1989 |
| JP | 2000-44835 A | 2/2000 |
| JP | 2003-96334 A | 4/2003 |
| JP | 2003-263780 A | 9/2003 |
| JP | 2004-131542 A | 4/2004 |
| JP | 2004-292690 A | 10/2004 |
| JP | 2005-146111 A | 6/2005 |
| JP | 2007-119671 A | 5/2007 |
| JP | 2007-204692 A | 8/2007 |
| JP | 2009-108315 A | 5/2009 |
| WO | WO 2005/063897 A1 | 7/2005 |
| WO | WO 2006/064652 A1 | 6/2006 |
| WO | WO 2007/052447 A1 | 5/2007 |
| WO | WO 2008/044583 A1 | 4/2008 |

* cited by examiner

Primary Examiner — Hoa (Holly) Le
(74) Attorney, Agent, or Firm — Birch, Stewart, Kolasch & Birch, LLP

(57) ABSTRACT

A resin-coated metallic pigment in which a coating layer constituted of a single layer or a plurality of layers is formed on a surface of a base particle, an outermost layer of the coating layer being composed of a resin which is a polymer containing one or more compounds selected from a monomer and an oligomer having two or more polymerizable double bonds as a constituent unit, and a surface portion of the outermost layer being treated with a surface modifier which is a compound having one polymerizable double bond.

15 Claims, No Drawings

RESIN-COATED METALLIC PIGMENT COMPRISING A SURFACE MODIFIER AT A SURFACE PORTION, WATER-BASED PAINT CONTAINING THE SAME, AND METHOD OF MANUFACTURING RESIN-COATED METALLIC PIGMENT

TECHNICAL FIELD

The present invention relates to a resin-coated metallic pigment, a water base paint containing the same, a coated product to which the water base paint has been applied, and a method of manufacturing the resin-coated metallic pigment. More specifically, the present invention relates to a resin-coated metallic pigment in which a coating layer exhibiting excellent water (moisture) resistance is formed when the pigment is included in a water base paint for application as a film, with chemical resistance of the film being maintained, a water base paint containing the same, a coated product to which the water base paint has been applied, and a method of manufacturing the resin-coated metallic pigment.

BACKGROUND ART

More attention has been paid to environmental issues in recent years, and a low-pollution water base paint without containing an organic solvent has attracted attention. In addition, with noticeable technical development in water base paints, appearance of high-grade finishing that could conventionally be achieved only by a solvent-type paint can now be realized also by a water base paint. In many metallic pigments (also referred to as metal pigments), however, a film obtained by blending the pigments in a water base paint has particularly been low in chemical resistance and water (moisture) resistance, and few practically usable water base paints have been available.

Chemical resistance of a film refers to such a property that, even when a film is immersed in an aqueous solution of a chemical agent such as acid, alkali or salt, various characteristics such as a color tone and the like are less likely to vary. This chemical resistance of a film containing metallic pigments is mainly dependent on capability of the metallic pigments. Therefore, in order to improve chemical resistance of a film formed by a paint containing metallic pigments, Japanese Patent Laying-Open No. 62-081460 (Patent Document 1) proposes a metal pigment coated with a copolymer of trimethylolpropane triacrylate and/or trimethylolpropane trimethacrylate and a small amount of acrylic acid and/or methacrylic acid. Japanese Patent Laying-Open No. 62-253668 (Patent Document 2) proposes a resin-coated metal pigment characterized in that a surface thereof is coated in a firmly adhered manner with a resin having highly three-dimensional structure and generated from radical polymeric unsaturated carboxylic acid and/or phosphomonoester or phosphodiester having radical polymeric double bond, and a monomer having three or more radical polymeric double bonds, that ΔE showing evaluation of alkali resistance is not higher than 1.0, and that the pigment does not substantially aggregate in a heat resistance and thermal stability test. Japanese Patent Laying-Open No. 64-040566 (Patent Document 3) proposes an aluminum flake evenly coated with a copolymer obtained as a result of reaction of at least two selected from the group consisting of an oligomer and a monomer having at least one polymeric double bond and having a microscopically smooth surface. Japanese Patent Laying-Open No. 2005-146111 (Patent Document 4) proposes a resin-coated aluminum pigment in which a surface of a raw material aluminum pigment is coated with a copolymer obtained by polymerizing a monomer having polymeric double bond, a monomer having one polymeric double bond and one benzene ring, and (meth) acrylic acid. Japanese Patent Laying-Open No. 2007-119671 (Patent Document 5) proposes a metal pigment in which phosphoric ester having radical polymeric double bond is adsorbed as a result of contact with the metal pigment and thereafter a resin-coated layer is formed by polymerization of a monomer having polymeric double bond.

In addition, water (moisture) resistance of a film refers to such a property as maintaining corrosion resistance capability that alteration of a color tone or the like of the film is prevented even when the film is held in water at a temperature relatively higher than room temperature (approximately from 40 to 50° C.) or in a moist state at a relative humidity not lower than 98%. This water (moisture) resistance of a film containing metallic pigments is also mainly dependent on capability of the metallic pigments. Therefore, in order to improve water (moisture) resistance of a film formed by a water base paint containing metallic pigments, Japanese Patent Laying-Open No. 2004-131542 (Patent Document 6) proposes an aluminum pigment coated with a hydrolytic condensate of a compound having siloxane bond. Japanese Patent Laying-Open No. 2007-204692 (Patent Document 7) proposes an aluminum pigment coated with hydrolytic condensate of a compound having siloxane bond and a resin composed of at least one selected from radical polymeric unsaturated carboxylic acid and/or phosphomonoester or phosphodiester or phosphoric acid monoester or phosphoric acid diester having radical polymeric double bond and a monomer having two or more radical polymeric double bonds.

According to these techniques, though market's demands are met to some extent in applications of an organic-solvent-based paint, capability of a film is insufficient in applications of a water base paint. This may be attributed to fundamental difference in resin and solvent between the paints, and in any case, higher capability of a film is required in a water base paint.

WO2006/064652 (Patent Document 8) proposes a metallic pigment including an aluminum particle as a base particle and having a coating layer constituted of a single layer or a plurality of layers for coating a surface of the aluminum particle formed thereon, in which an outermost layer of the coating layer contains a polymer obtained as a result of polymerization reaction of a monomer having a basic group and at least one polymeric double bond, and also proposes a metallic pigment having a surface modifier layer formed outside the coating layer.

According to this Patent Document 8, since the coating layer is formed in order to provide the metallic pigment further with corrosion resistance (paragraph 0042 of Patent Document 8), it is understood that the surface modifier layer serving as an outermost surface layer of the coating layer is formed literally in a layered manner.

In such Patent Document 8, the reason why the outermost layer located directly under the surface modifier layer contains a polymer obtained as a result of polymerization reaction of a monomer having a basic group and at least one polymeric double bond is to form a basic point serving as an adsorption site for a phosphate group of the surface modifier layer on the surface of the outermost layer, and thus firm adsorption between the surface modifier layer and the outermost layer attributed to acid-base interaction can be achieved (the same paragraph). Such a feature can exhibit an advantage that corrosion resistance can satisfactorily be maintained if the metallic pigment is included in a powder paint. On the other hand, if this metallic pigment is blended in a water base paint, water (moisture) resistance thereof was not sufficient for practical use, although its chemical resistance was similarly good. Therefore, further improvement in water (moisture) resistance with chemical resistance being maintained has been demanded.

In general, chemical resistance does not tend to be improved by surface treatment for providing water (moisture) resistance, whereas water (moisture) resistance does not tend to be improved by surface treatment for providing chemical resistance. Therefore, it has been difficult to obtain a pigment achieving both of chemical resistance and water (moisture) resistance at a level sufficient for practical use.

PRIOR ART DOCUMENTS

Patent Documents

Patent Document 1: Japanese Patent Laying-Open No. 62-081460
Patent Document 2: Japanese Patent Laying-Open No. 62-253668
Patent Document 3: Japanese Patent Laying-Open No. 64-040566
Patent Document 4: Japanese Patent Laying-Open No. 2005-146111
Patent Document 5: Japanese Patent Laying-Open No. 2007-119671
Patent Document 6: Japanese Patent Laying-Open No. 2004-131542
Patent Document 7: Japanese Patent Laying-Open No. 2007-204692
Patent Document 8: WO2006/064652

SUMMARY OF THE INVENTION

Problems to be Solved by the Invention

As a result of dedicated studies in view of the circumstances as above, it was found that, though it is preferred to form a coating layer on a surface of a metallic pigment in order to improve various characteristics thereof, polymeric double bond remaining at a surface portion of the coating layer leads to a disadvantage in achieving both of chemical resistance and water (moisture) resistance. Then, as a result of further studies, it also became clear that such polymeric double bond tends to noticeably remain if an outermost surface of the coating layer is formed with continuous resin layers.

The present invention was made based on such finding, and an object of the present invention is to provide a resin-coated metallic pigment achieving water (moisture) resistance improved to a level sufficient for practical use, of a film obtained as a result of blending in a water base paint with chemical resistance of the film being maintained, a water base paint containing the same, a coated product to which the water base paint has been applied, and a method of manufacturing the resin-coated metallic pigment.

Means for Solving the Problems

The present invention relates to a resin-coated metallic pigment including a base particle having a coating layer constituted of a single layer or a plurality of layers formed on its surface, an outermost layer of the coating layer being composed of a resin which is a polymer containing one or more compounds selected from a monomer and an oligomer having two or more polymeric (i.e., polymerizable) double bonds as a constituent unit, and a surface portion of the outermost layer being treated with a surface modifier which is a compound having one polymeric double bond.

Here, preferably, the surface modifier above is ester of unsaturated carboxylic acid. In addition, preferably, the resin-coated metallic pigment above contains the surface modifier above at a ratio of 0.1 to 10 parts by mass with respect to 100 parts by mass base particle above.

In addition, the base particle above is preferably an aluminum particle and preferably a colored aluminum particle to which surface an inorganic pigment or an organic pigment adhered. In addition, the base particle above is preferably an interference color aluminum particle in which one or more inorganic compound layer or metal layer exhibiting an interferential action is formed on a surface of an aluminum particle.

Moreover, preferably, the resin-coated metallic pigment above is preferably used for a water base paint, and in this regard, the present invention also relates to a water base paint containing this resin-coated metallic pigment. Further, the present invention relates to a coated product to which the water base paint above has been applied.

In addition, the present invention relates to a method of manufacturing a resin-coated metallic pigment including a base particle having a coating layer constituted of a single layer or a plurality of layers formed on its surface, including the steps of forming on the surface of the base particle above, an outermost layer of the coating layer by causing polymerization reaction of one or more compound selected from a monomer and an oligomer having two or more polymeric double bonds, and treating a surface portion of the outermost layer with a surface modifier which is a compound having one polymeric double bond.

Here, preferably, in the above step of treating with a surface modifier, the surface modifier is bonded to the surface portion of the outermost layer as a result of reaction of the polymeric double bond remaining at the surface portion of the outermost layer and the polymeric double bond contained in the surface modifier.

Effects of the Invention

According to the present invention, if the resin-coated metallic pigment is used for a water base paint while the film including the resin-coated metallic pigment having the feature of the present invention maintains its chemical resistance, water (moisture) resistance of the obtained film can be improved to a level sufficient for practical use. The present invention provides a resin-coated metallic pigment having such a feature, a water base paint containing the same, a coated product to which the water base paint has been applied, and a method of manufacturing the resin-coated metallic pigment.

MODES FOR CARRYING OUT THE INVENTION

<Resin-Coated Metallic Pigment>

The resin-coated metallic pigment according to the present invention has a feature that a coating layer constituted of a single layer or a plurality of layers is formed on a surface of a base particle. Each feature will be described hereinafter.

<Base Particle>

Any conventionally known base particle can be used as a base particle for the resin-coated metallic pigment according to the present invention so long as it can serve as a base particle for a metallic pigment of this type, and it is not particularly limited. For example, a metal particle or an inorganic compound particle can be used as such a base particle. Examples of metal particles include a metal particle of aluminum, zinc, copper, bronze, nickel, titanium, stainless, and the like, and an alloy particle thereof. Among these metal particles, an aluminum particle is particularly suitable because it is excellent in metallic gloss, inexpensive, small in specific gravity, and hence easy to handle. Meanwhile, examples of inorganic compound particles include glass, mica, a ceramic particle of alumina, titania, or the like.

A shape of the base particle in the present invention is not particularly limited, and for example, various shapes such as a particle, a plate, a lump, a flake (a scale), and the like may be adopted, however, in order to provide a film with excellent brightness, a flake shape is preferred. In addition, the base particle normally has an average particle size preferably from approximately 1 to 100 µm and more preferably from 3 to 60 µm. If the base particle has an average particle size smaller than 1 µm, handling in a manufacturing process is difficult and the base particles tend to aggregate. On the other hand, if the base particle has an average particle size exceeding 100 µm, a surface of the film roughens when used as a paint and preferred design may not be realized.

If such a base particle has a flake shape, an average thickness thereof is not particularly limited, however, it is preferably not smaller than 0.005 µm and particularly more preferably not smaller than 0.02 µm. In addition, the average thickness is preferably not greater than 5 µm and particularly more preferably not greater than 3 µm. If the base particle has an average thickness smaller than 0.005 µm, handling in a manufacturing process is difficult and the base particles tend to aggregate. On the other hand, if the base particle has an average thickness exceeding 5 µm, feel of particles of the film (irregularities) becomes noticeable or covering capability is insufficient, and preferred design may not be realized.

An average particle size of the base particle as above can be found by calculating an average volume based on particle size distribution determined by a known particle size distribution measurement method such as laser diffractometry, micromesh sieve or a Coulter counter method. In addition, an average thickness can be calculated based on covering capability and density of base particles.

In the present invention, a metal particle having a flake shape can be used as the base particle as described above. Such a metal particle in a flake shape can be obtained, for example, by grinding metal powders prepared as a raw material with a ball mill or the like. When a metal particle in a flake shape thus obtained is used as the base particle, a grinding agent added at the time of grinding may adsorb on the surface of the metal particle. Examples of the grinding agents include fatty acids such as oleic acid and stearic acid, aliphatic amines, aliphatic amides, aliphatic alcohols, ester compounds, and the like. These agents have an effect to suppress undue oxidation of the surface of the metal particles and to improve gloss. An amount of adsorption of the grinding agent is preferably less than 2 parts by mass with respect to 100 parts by mass metal particles. The amount of adsorption less than 2 parts by mass is advantageous in that lowering in gloss of the surface is less and a coating layer readily adheres.

Alternatively, if an aluminum particle is used as the metal particle, a colored aluminum particle having an inorganic pigment or an organic pigment adhered to its surface can be used as the aluminum particle, and further an interference color aluminum particle in which one or more inorganic compound layer or metal layer exhibiting interferential action is formed on the surface of the aluminum particle can also be used as the aluminum particle. By using such a colored aluminum particle or an interference color aluminum particle as the base particle, a film having a unique design characteristic can be formed.

Here, an inorganic pigment or an organic pigment used for forming a colored aluminum particle is not particularly limited, however, examples thereof include quinacridone, diketopyrrolopyrrole, isoindolinone, indanthrone, perylene, perinone, anthraquinone, dioxazine, benzimidazolone, triphenylmethane quinophthalone, anthrapyrimidine, chrome yellow, pearl mica, transparent pearl mica, colored mica, interference mica, phthalocyanine, halogenated phthalocyanine, azo pigment (azomethine metal complex, condensed azo, or the like), titanium oxide, carbon black, iron oxide, copper phthalocyanine, a condensed polycyclic pigment, and the like. Such an inorganic pigment or organic pigment can adhere to the surface of the aluminum particle, for example, by coating the pigment with a dispersant and thereafter stirring and mixing with the aluminum particles in a non-polar solvent.

Meanwhile, a method of forming one or more inorganic compound layer or metal layer exhibiting an interferential action on the surface of the aluminum particle in the interference color aluminum particle is not particularly limited, however, for example, a sol-gel process, solution deposition, electroless plating, chemical vapor deposition, physical vapor deposition, or the like can be employed. A chemical substance used here is not particularly limited, however, examples thereof include a metallic substance (to serve as a metal layer) composed of a metal such as gold, silver, copper, nickel, cobalt, titanium, aluminum, or silicon, or an alloy thereof, oxide thereof (to serve as an inorganic compound layer), or the like. The number of inorganic compound layers or metal layers is not particularly limited, and it may be one or two or more. It is noted that such an inorganic compound layer or metal layer has a thickness preferably from 5 to 200 nm and more preferably from 10 to 150 nm.

In addition, depending on usage, an inorganic layer or an organic layer providing various functions may be provided in advance on the surface of the aluminum particle as pre-treatment, before an inorganic pigment or an organic pigment adheres to the surface of the aluminum particle in the colored aluminum particle described previously or before an inorganic compound layer or a metal layer exhibiting an interferential action is formed on the surface of the aluminum particle in the interference color aluminum particle.

<Coating Layer>

In the resin-coated metallic pigment according to the present invention, a coating layer constituted of a single layer or a plurality of (two or more) layers is formed on the surface of the base particle. When a coating layer formed of a single layer is formed, only the outermost layer which will be described later serves as the coating layer. On the other hand, when the coating layer constituted of a plurality of layers is formed, layer(s) other than the outermost layer is (are) not particularly limited so long as the outermost layer is included, and any layer may be included.

Examples of such a layer other than the outermost layer include a metallic substance layer (similar to the metal layer in the interference color aluminum particle), a metal oxide layer (crystalline or amorphous), a metal hydroxide layer, a metal hydrate layer, a resin layer, and the like.

A thickness of the coating layer is not particularly limited, however, a thickness is preferably from 5 to 150 nm and more preferably from 10 to 100 nm.

<Outermost Layer>

The outermost layer of the coating layer forming the resin-coated metallic pigment according to the present invention is composed of a resin which is a polymer containing one or more compound selected from a monomer and an oligomer having two or more polymeric double bonds as constituent unit. Namely, the resin forming the outermost layer is obtained by polymerizing one or more compound selected from a monomer and an oligomer having two or more polymeric double bonds. Such polymerization may be achieved by polymerizing only one or more compound selected from a monomer and an oligomer having two or more polymeric double bonds, or by polymerizing the one or more compound and another one compound or two or more compounds. Namely, a polymer containing one or more compound selected from a monomer and an oligomer having two or more polymeric double bonds as constituent unit refers not only to a polymer obtained by polymerizing only one or more compound selected from a monomer and an oligomer having two or more polymeric double bonds but also to a polymer obtained by polymerizing the one or more compound and another one compound or two or more compounds.

As a result of formation of this outermost layer, good chemical resistance is provided to the resin-coated metallic pigment according to the present invention. Since the resin forming this outermost layer is obtained by polymerizing one or more compound selected from a monomer and an oligomer having two or more polymeric double bonds, chemical resistance is improved by a cross-linking function of the polymeric double bond.

Here, for example, ester of unsaturated carboxylic acid (specifically, tetramethylolmethane tetraacrylate, tetramethylolmethane triacrylate, trimethylolpropane triacrylate, triethylene glycol diacrylate, 1,4-butanediol diacrylate, 1,6-hexanediol diacrylate, 1,9-nonanediol diacrylate, pentaerythritol triacrylate, ethylene glycol dimethacrylate, glycerol dimethacrylate, diethylene glycol dimethacrylate, triethylene glycol dimethacrylate, tetramethylolmethane trimethacrylate, trimethylolpropane trimethacrylate, 1,4-butanediol dimethacrylate, 1,6-hexanediol dimethacrylate, 1,9-nonanediol dimethacrylate, 1,10-decanediol dimethacrylate, and the like) is preferably exemplified as the monomer having two or more polymeric double bonds. In addition, an acyclic unsaturated compound (such as divinylbenzene) or the like can also suitably be employed.

In addition, for example, epoxidized 1,2-polybutadiene, acrylic-modified polyester, acrylic-modified polyether, acrylic-modified urethane, acrylic-modified epoxy, acrylic-modified spiran (all of which have a degree of polymerization from approximately 2 to 20), and the like can be exemplified as the oligomer having two or more polymeric double bonds. Among these, acrylic-modified polyester and epoxidized 1,2-polybutadiene having a degree of polymerization from 3 to 10 are preferred. Use of such an oligomer is preferred in that polymerization reaction gradually proceeds and reaction efficiency is very high.

Meanwhile, examples of compounds other than one or more compound selected from a monomer and an oligomer having two or more polymeric double bonds (also denoted as a "first compound" for the sake of convenience), that is, one compound or two or more compounds that can form the outermost layer by being polymerized with the first compound (such a compound being denoted as a "second compound" for the sake of convenience) include cyclic unsaturated compounds (such as cyclohexene), acyclic unsaturated compounds (such as styrene, cc-methyl styrene, vinyltoluene, cyclohexene vinyl monoxide, vinyl acetate, vinyl propionate, or diallylbenzene), and the like.

Though an amount of use of one or more compound selected from a monomer and an oligomer having two or more polymeric double bonds (that is, an amount polymerized for forming a resin forming the outermost layer) is different depending on a type and a characteristic of the base particle, generally, it is set preferably to 1 to 40 part(s) by mass with respect to 100 parts by mass base particles, but it is not limited as such. If the amount of use is less than 1 part by mass, chemical resistance may be lowered. If the amount of use exceeds 40 parts by mass, covering capability or surface gloss may be lowered.

Although different depending on a type and a characteristic of the base particle, such an outermost layer has a thickness preferably from 5 to 150 nm and more preferably from 10 to 100 nm. If the thickness is smaller than 5 nm, chemical resistance may be lowered. If the thickness exceeds 150 nm, covering capability or surface gloss may be lowered.

<Surface Portion of Outermost Layer>

The present invention is characterized in that the surface portion of the outermost layer above is treated with a surface modifier which is a compound having one polymeric double bond. Thus, excellent water (moisture) resistance performance is provided to the resin-coated metallic pigment according to the present invention, and together with the function of improvement in chemical resistance of the outermost layer itself as described above, chemical resistance and water (moisture) resistance can both be achieved at high level. Therefore, when the resin-coated metallic pigment is used for the water base paint with chemical resistance of the film including the resin-coated metallic pigment according to the present invention being maintained, water (moisture) resistance of the obtained film could be improved to a level sufficient for practical use.

Here, the phrase of the surface portion of the outermost layer being treated with the surface modifier in the present invention is used to mean a treatment operation for bonding this surface modifier to the surface portion of the outermost layer by causing reaction between polymeric double bond remaining at the surface portion of the outermost layer (derived from an unreacted product of the monomer or the oligomer forming the resin serving as the outermost layer) and one polymeric double bond included in the surface modifier, however, a mechanism of this treatment operation is based on the present inventors' studies. Namely, as described previously, the resin forming the outermost layer is composed of a polymer generated as a result of polymerization reaction of one or more compound selected from a monomer and an oligomer having two or more polymeric double bonds, and it is estimated that unreacted polymeric double bond still remains in the polymer even after polymerization reaction ended. This unreacted polymeric double bond tends to react to various substances because of its high reactivity, and it reacts even to a varnish component in a water base paint, which is considered as a main factor causing prevention of curing of the varnish component, failure in exhibition of the film's own performance, and water (moisture) resistance being interfered. In particular, if unreacted polymeric double bond remains at the surface portion of the outermost layer, this tendency seems to be noticeable. Then, if the surface modifier is bonded to the surface portion of the outermost layer through reaction between unreacted polymeric double bond remaining at the surface portion of the outermost layer and one polymeric double bond included in the surface modifier, highly reactive polymeric double bond is consequently eliminated or decreased at the surface portion of the outermost layer. Thus, it is considered that a chemically stable outermost layer surface (that is, a coating layer surface) is created. Therefore, if the resin-coated metallic pigment according to the present invention is used for the water base paint, it is considered that the film's own performance is exhibited without the varnish component in the water base paint being prevented from curing, and water (moisture) resistance performance of the film is improved. Even if one or more compound selected from a monomer and an oligomer having two or more polymeric double bonds and the surface modifier are polymerized at the time of forming the outermost layer, unreacted polymeric double bond at the surface portion of the outermost layer cannot be eliminated or decreased. It is clear from the consideration above that the effect above is achieved only by treating the surface portion of the outermost layer with the surface modifier after the outermost layer is once formed. In this regard, it is difficult to define the surface portion of the outermost layer with a numeric value (for example, a thickness from the outermost surface or the like).

In the present invention, an amount of use (an amount for treating the surface portion of the outermost layer) of the surface modifier above is set preferably to 0.1 to 10 parts by mass with respect to 100 parts by mass base particles and more preferably to 0.3 to 5 parts by mass. If the amount of use of the surface modifier is less than 0.1 parts by mass, sufficient water (moisture) resistance does not tend to be exhibited. Alternatively, if the amount of use of the surface modifier exceeds 10 parts by mass, film performance such as water (moisture) resistance may not sufficiently be obtained.

The surface modifier according to the present invention is a compound having one polymeric double bond as described above. For example, unsaturated carboxylic acid (such as acrylic acid, methacrylic acid, crotonic acid, itaconic acid, citraconic acid, and the like) and esters thereof (such as methyl acrylate, ethyl acrylate, n-butyl acrylate, isobutyl acrylate, 2-ethylhexyl acrylate, isodecyl acrylate, lauryl acrylate, stearyl acrylate, butoxy acrylate, dimethyl amino ethyl acrylate, diethyl amino ethyl acrylate, 2-hydroxybutyl acrylate, hydroxyethyl acrylate, 2-hydroxypropyl acrylate, methoxyethyl acrylate, butoxyethyl acrylate, glycidyl acrylate, cyclohexyl acrylate, methyl methacrylate, ethyl methacrylate, n-butyl methacrylate, isobutyl methacrylate, 2-ethylhexyl methacrylate, isodecyl methacrylate, n-lauryl methacrylate, n-stearyl methacrylate, n-butoxyethyl methacrylate, dimethyl amino ethyl methacrylate, diethyl amino ethyl methacrylate, 2-hydroxybutyl methacrylate, hydroxyethyl methacrylate, 2-hydroxypropyl methacrylate, methoxyethyl methacrylate, butoxyethyl methacrylate, glycidyl methacrylate, and cyclohexyl methacrylate) are preferably exemplified as the compound. Among these, ester of unsaturated carboxylic acid above is preferably used, because ester of unsaturated carboxylic acid is readily polymerized with a polymer having unreacted polymeric double bond and a surface modification effect is readily obtained.

The surface modifier layer in Patent Document 8 described previously forms a layer, whereas the surface modifier used in the present invention is bonded in an interspersed manner at the surface portion of the outermost layer and the surface modifier itself does not form a layer, because one polymeric double bond included therein reacts to polymeric double bond remaining at the surface of the outermost layer. If a surface modifier layer is formed literally as a layer as in Patent Document 8, unreacted surface modifier will remain whichever measures may be taken. Consequently, highly reactive polymeric double bond (derived from unreacted surface modifier) remains at the surface modifier layer.

If a coating layer including a polymer obtained as a result of polymerization reaction of a monomer having a basic group and at least one polymeric double bond is formed as in the outermost layer in Patent Document 8, the polymer includes also a monomer and/or an oligomer other than the monomer having the basic group and at least one polymeric double bond as a constituent component. In this case, since unreacted polymeric double bond remains at the surface of the outermost layer in Patent Document 8, the surface is not chemically stable. Therefore, if this pigment is used in the water base paint, a desired effect (particularly water (moisture) resistance) cannot be achieved. In addition, if a coating layer is formed only of a polymer obtained as a result of polymerization reaction of a monomer having a basic group and at least one polymeric double bond as in the outermost layer in Patent Document 8, sharp increase in viscosity of the entire system or solidification thereof due to generation of free polymer particles not used in formation of the layer may occur.

<Manufacturing Method>

A method of manufacturing a resin-coated metallic pigment according to the present invention is a method of manufacturing a resin-coated metallic pigment including a base particle having a coating layer constituted of a single layer or a plurality of layers formed on its surface, and it is characterized by including the steps of forming on the surface of the base particle above, an outermost layer of the coating layer by causing polymerization reaction of one or more compound selected from a monomer and an oligomer having two or more polymeric double bonds, and treating a surface portion of the outermost layer with a surface modifier which is a compound having one polymeric double bond.

Here, preferably, in the above step of treating with a surface modifier, the surface modifier is bonded to the surface portion of the outermost layer as a result of reaction of the polymeric double bond remaining at the surface portion of the outermost layer and the polymeric double bond contained in the surface modifier.

If the coating layer above includes a layer other than the outermost layer, the manufacturing method according to the present invention can include any step for forming such a layer other than the outermost layer. In this case, forming an outermost layer on the surface of the base particle above means formation of an outermost layer on the layer other than the outermost layer.

<Step of Forming Outermost Layer>

In the step of forming the outermost layer of the coating layer above (also simply denoted as the "outermost layer formation step"), for example, polymerization reaction can be caused by dispersing base particles in a solvent and thereafter adding one or more compound selected from a monomer and an oligomer having two or more polymeric double bonds to the dispersion. Thus, the outermost layer can be formed on the surface of the base particle. Here, in order to form the outermost layer in this manner, the timing or the number of times of addition for adding one or more compound (first compound) selected from a monomer and an oligomer having two or more polymeric double bonds is not particularly limited, and a total amount may be added at once or addition as divided in several doses may be carried out. In the outermost layer formation step of the present invention, the second compound described previously can also be added in addition to these first compounds.

Preferred specific examples of the solvent above used for polymerization reaction (in which the base particles are dispersed) can include aliphatic hydrocarbons such as hexane, heptane, octane, cyclohexane, and mineral spirit, aromatic hydrocarbons such as benzene, xylene and toluene, halogenated hydrocarbons such as chlorobenzene, trichlorobenzene, perchloroethylene, and trichloroethylene, alcohols such as methanol, ethanol, 1-propanol, isopropyl alcohol, n-butanol, s-butanol, and t-butanol, ketones such as acetone, acetylacetone, methyl ethyl ketone, diethyl ketone, cyclohexanone, methyl isobutyl ketone, methyl-n-butyl ketone, and methyl-n-propyl ketone, esters such as ethyl acetate and propyl acetate, ethers such as tetrahydrofuran, diethyl ether, and ethyl propyl ether, and the like.

In addition, in the outermost layer formation step, a polymerization initiator is preferably used, and in particular, a radical initiator generally known as a radical generator can be used. Specific examples of the polymerization initiator include peroxides such as benzoyl peroxide, lauroyl peroxide, isobutyl peroxide, and methyl ethyl ketone peroxide, azo compounds such as AIBN (azo bis isobutyronitrile), and the like.

Here, an amount of blending the polymerization initiator for polymerization reaction is preferably not less than 0.5 parts by mass with respect to 100 parts by mass first compound and particularly more preferably not less than 1 part by mass. In addition, this blending amount is preferably not more than 30 parts by mass and particularly more preferably not more than 20 parts by mass. If the amount of blending the polymerization initiator is not less than 0.5 parts by mass, it is preferred in that polymerization reaction reliably proceeds and the outermost layer in an intended amount can readily be formed. Meanwhile, if the blending amount is not more than 30 parts by mass, it is preferred in that sudden progress of polymerization can be prevented, a generated polymer can reliably adsorb onto the base particle, and sharp increase in viscosity of the entire system or solidification thereof due to generation of free polymer particles can be prevented.

In the outermost layer formation step, a temperature for polymerization reaction is defined by a type of the polymerization initiator to be used. A half-life of the polymerization initiator is uniquely determined by a temperature, and a temperature setting a half-life of the polymerization initiator to 5 minutes or longer is preferred and a temperature setting a half-life thereof to 15 minutes or longer is particularly more preferred.

In addition, this temperature is preferably a temperature setting a half-life of the polymerization initiator to 20 hours or shorter and particularly more preferably a temperature setting a half-life thereof to 10 hours or shorter. For example, if AIBN is used as the polymerization initiator, a temperature from 70 to 90° C. is a more preferred temperature range. If polymerization reaction occurs at such a temperature as setting a half-life of the polymerization initiator to 20 hours or shorter, it is preferred in that a problem that polymerization reaction only gradually proceeds is less likely. If polymerization reaction occurs at such a temperature as setting a half-life of the polymerization initiator to 5 minutes or longer, it is preferred in that sudden progress of polymerization can be prevented, a generated polymer can reliably adsorb onto the base particle, and sharp increase in viscosity of the entire system or solidification thereof due to generation of free polymer particles can be prevented.

In such an outermost layer formation step, in order to enhance polymerization yield, it is advantageous to cause polymerization reaction in an atmosphere of an inert gas such as nitrogen, helium or argon.

<Step of Treatment with Surface Modifier>

The resin-coated metallic pigment according to the present invention is manufactured by performing the step of treating the surface portion of the outermost layer with the surface modifier which is the compound having one polymeric double bond (also simply denoted as the "surface modifier treatment step") after the outermost layer is formed on the surface of the base particle in the outermost layer formation step above. This surface modifier treatment step preferably achieves bonding of the surface modifier to the surface portion of the outermost layer as a result of reaction between polymeric double bond remaining at the surface portion of the outermost layer and polymeric double bond included in the surface modifier.

In such a surface modifier treatment step, for example, after the outermost layer formation step above, the base particle having the outermost layer formed is dispersed in a solvent, the surface modifier which is a compound having one polymeric double bond is added, and reaction is caused by using a radical initiator or the like as appropriate, so that the surface modifier can be bonded to the surface portion of the outermost layer.

The surface modifier treatment step is not limited to such a method alone, and any method may be employed so long as it is performed after the outermost layer formation step. For example, the surface modifier treatment step may be performed after unreacted monomer or oligomer for forming the outermost layer is removed by washing the base particle having the outermost layer formed with a solvent used in the outermost layer formation step. In this case, the surface modifier treatment step may be performed by preparing slurry of the base particles above with the use of a solvent used for washing without performing a drying step after washing of the base particle, or the surface modifier treatment step may be performed by washing the base particle above and powdering the base particle after the drying step and then dispersing again the base particle in a solvent.

Alternatively, the surface modifier treatment step may be performed by successively adding the surface modifier to the solvent in which the base particles subjected to such an outermost layer formation step have been dispersed without washing the base particle having the outermost layer formed in the outermost layer formation step with the use of a solvent used in polymerization reaction. Considering tightly bonding the surface modifier to the outermost layer formed on the surface of the base particle and simplification or cost efficiency of the process, the surface modifier treatment step is particularly preferably performed by successively adding the surface modifier without washing the base particle having the outermost layer formed in the outermost layer formation step with the use of the solvent used in polymerization reaction. Therefore, a solvent to be used in the surface modifier treatment step is not particularly limited, however, a solvent similar to that used in the outermost layer formation step is preferably used. In addition, in the surface modifier treatment step, a monomer or an oligomer for forming the outermost layer that was used in the outermost layer formation step preferably completes polymerization reaction in its entirety, however, in industrial production, a long reaction time is required to complete polymerization reaction of the monomer or the oligomer in its entirety. Therefore, if 80 mass % or more monomer or oligomer added in the outermost layer formation step completed polymerization reaction, the surface modifier treatment step may be performed by successively adding the surface modifier to the solvent in which the base particles subjected to the outermost layer formation step have been dispersed, even though unreacted monomer or oligomer may remain.

In order to efficiently and reliably achieve reaction between polymeric double bond remaining at the surface portion of the outermost layer and polymeric double bond included in the surface modifier, the polymerization initiator is preferably used. A type of the polymerization initiator to be used is not particularly limited, however, a polymerization initiator similar to that used for polymerization reaction in the outermost layer formation step is preferably used.

Here, an amount of blending the polymerization initiator for causing reaction of the surface modifier is preferably not less than 0.5 parts by mass with respect to 100 parts by mass surface modifier and particularly more preferably not less than 1 part by mass. Meanwhile, this blending amount is preferably not more than 30 parts by mass and particularly more preferably not more than 20 parts by mass. If the amount of blending the polymerization initiator is not less than 1 part by mass, it is preferred in that reaction reliably proceeds and most polymeric double bonds remaining at the surface of the outermost layer are readily bonded to (polymeric double bond included in) the surface modifier. If the blending amount is not more than 30 parts by mass, it is preferred in that sudden progress of reaction can be prevented, bonding between the surface modifiers can be prevented and hence the surface modifier can reliably be bonded to polymeric double bond remaining at the surface of the outermost layer, as well as sharp increase in viscosity of the entire system or solidification thereof due to generation of a polymer caused by bonding between the surface modifiers can be prevented.

In the surface modifier treatment step above, a reaction temperature is defined by the type of the polymerization initiator to be used, as in the outermost layer formation step. A half-life of the polymerization initiator is uniquely determined by a temperature, and a temperature setting a half-life of the polymerization initiator to 5 minutes or longer is preferred and a temperature setting a half-life thereof to 15 minutes or longer is particularly more preferred.

In addition, this temperature is preferably a temperature setting a half-life of the polymerization initiator to 20 hours or shorter and particularly more preferably a temperature setting a half-life thereof to 10 hours or shorter. For example, if AIBN is used as the polymerization initiator, a temperature from 70 to 90° C. is a more preferred temperature range. If reaction occurs at such a temperature as setting a half-life of the polymerization initiator to 20 hours or shorter, it is preferred in that a problem that reaction only gradually proceeds is less likely. If reaction occurs at such a temperature as setting a half-life of the polymerization initiator to 5 minutes or longer, it is preferred in that sudden progress of reaction can be prevented, bonding between the surface modifiers can be prevented and hence the surface modifier can reliably be bonded to polymeric double bond remaining at the surface of the outermost layer, as well as sharp increase in viscosity of the entire system or solidification thereof due to generation of a polymer caused by bonding between the surface modifiers can be prevented.

In the surface modifier treatment step, in order to enhance reaction efficiency, it is advantageous to cause polymerization reaction in an atmosphere of an inert gas such as nitrogen, helium or argon. After the surface modifier treatment step ends, the obtained resin-coated metallic pigment according to the present invention is washed with the solvent used for reaction, so as to remove unreacted monomer or oligomer and the surface modifier. In addition, depending on an application, a solvent may be substituted by a prescribed solvent. It is noted that such a surface modifier treatment step can be performed by using one surface modifier or two or more surface modifiers.

<Application>

The resin-coated metallic pigment according to the present invention is preferably used for a water base paint. In this regard, the present invention also relates to a water base paint containing this resin-coated metallic pigment and further to a coated product to which the water base paint above has been applied.

Thus, the resin-coated metallic pigment according to the present invention can be used as it is blended in a known and commonly used water base paint. A water base paint containing the resin-coated metallic pigment according to the present invention and a binder (varnish) is preferably exemplified as the water base paint. These paints may be of a one-component type or a mixture of two or more components, or may accompany reaction. The water base paint containing the resin-coated metallic pigment according to the present invention can contain other pigments or dyes, in accordance with an aimed hue. It is noted that other pigments are desirably used so long as they do not impair metallic feel achieved by the resin-coated metallic pigment according to the present invention. Though a binder is not particularly limited so long as it is a generally used binder, an emulsion binder can preferably be exemplified. Various natural or synthetic polymers, oligomers, prepolymers, and the like can be used as the emulsion binder. These paints can contain various additives as necessary. Examples of the additives include a surfactant, a stabilizer, a rust preventive, a plasticizer, a pigment wetting agent, a pigment dispersant, a fluidity adjuster, a leveling agent, an antirust, a UV absorber, and the like.

It is noted that an object to be painted, to which the water base paint according to the present invention is applied, is not particularly limited, so long as such a water base paint can be applied thereto.

EXAMPLES

The present invention will more specifically be described hereinafter with reference to Examples and Comparative Examples, however, the present invention is not limited to these Examples. Table 1 shows monomers and oligomers used in the present Examples and Comparative Examples.

<Preparation of Water Base Paint>

A composition I was prepared by stirring and mixing for 30 minutes or longer, 31.48 g acryl dispersion (Setaqua 6802 manufactured by Neuplex), 18.89 g polyurethane dispersion A (Bayhydrol® XP2621 manufactured by Sumika Bayer Urethane Co., Ltd.), 4.61 g polyurethane dispersion B (Bayhydrol® PT241 manufactured by Sumika Bayer Urethane Co., Ltd.), 2.1 g melamine compound (Cymel 327 manufactured by Mitsui Cytec Ltd.), 2.79 g butyl glycol, 0.31 g surfactant (Byk-347 manufactured by BYK Japan K.K.), 0.56 g thickening agent (Viscalex® HV30 manufactured by Nichigo Mowinyl Co., Ltd.), 13.96 g ion exchanged water, and 3.04 g 10% dimethyl ethanolamine aqueous solution.

In addition, metallic pigments of which non-volatile part corresponds to 1.12 g (in the Examples below, the resin-coated metallic pigment according to the present invention) were taken in a plastic container, to which 2.43 g butyl glycol was added so as to achieve uniform dispersion by using a glass rod. Moreover, a composition II was prepared by adding to the above 2 g dispersant (Disperbyk 190 manufactured by BYK Japan K.K.), 0.08 g wetting agent (Byk-011 manufactured by BYK Japan K.K.), and 0.12 g pigment wetting dispersant (AQ320 manufactured by Kusumoto Chemicals, Ltd.) and stirring and mixing the same for 10 minutes or longer.

After composition I above and composition II above were stirred and mixed for 10 minutes or longer, 10% dimethyl ethanolamine aqueous solution was added thereto such that pH of that mixture is not lower than 8, followed by stirring and mixing for 10 minutes or longer. Thereafter, an appropriate amount of ion exchanged water was added to the above such that viscosity attains to a reference value (flow time of 25 seconds with Ford cup No. 4), followed by stirring and mixing for 10 minutes or longer, whereby the water base paint was obtained.

Further, 51.15 g polyacrylate (Desmophen A870BA manufactured by Sumika Bayer Urethane Co., Ltd.), 0.53 g additive A (10% xylene solution of Baysilone Paint Additive OL17 manufactured by Borchers), 0.53 g additive B (1% xylene solution of Modaflow manufactured by Monsanto), 5.3 g additive C (10% xylene solution of Tinuvin 292 manufactured by Ciba Spezialitatenchemie Lampertheim), 10.7 g additive D (10% xylene solution of Tinuvin 1130 manufactured by Ciba Spezialitatenchemie Lampertheim), 10.17 g dilution solvent A (1-methoxypropyl acetate: solvent naphtha=1:1), and 2.13 g dilution solvent B (butyl glycol acetate) were stirred and mixed for 30 minutes or longer. Thereafter, 19.49 g dilution at 9:1 of isocyanurate (Sumidule N3300 manufactured by Sumika Bayer Urethane Co., Ltd.) and a butyl acetate: solvent naphtha=1:1 solvent mixture was added, and then mixed and stirred for 30 minutes or longer, to thereby obtain a clear coating.

<Method of Fabricating Painted Plate>

A metal plate was spray-painted with the water base paint prepared as above. The obtained spray-painted plate was set at room temperature for 5 minutes or longer and thereafter the spray-painted plate was dried at 80° C. for 3 minutes. Thereafter, the spray-painted plate was set at room temperature for 10 minutes or longer and thereafter the clear coating was further applied to the spray-painted plate by spraying. After the clear coating was applied, the plate was set at room temperature for 10 minutes or longer and baking at 130° C. was performed for 30 minutes, to thereby obtain a spray-painted plate. With regard to a thickness of the film in this painted plate, a paint condition in spray-painting above was adjusted such that a water base paint film had a thickness from 14 to 18 μm and a clear coating film had a thickness from 35 to 40 μm.

<Colorimetry>

In order to specify a color tone of the painted plate obtained above, a variable colorimeter ("X-Rite MA-6811" manufactured by X-Rite) was used to measure values for $L^*_{45}$, $a^*_{45}$ and $b^*_{45}$ of the film formed on the painted plate at an observation angle θ of 45 degrees (light reception in a direction of normal of the film). In addition, color difference $\Delta E^*_{45}$ of the film before and after various tests (performance tests) which will be described below was calculated based on values for $L^*_{45}$, $a^*_{45}$ and $b^*_{45}$ measured before and after the tests.

<Chemical Resistance Test>

Here, 4.88 parts by mass obtained metallic pigment (in the Examples below, the resin-coated metallic pigment according to the present invention), 35.0 parts by mass varnish (acrydic A-165 manufactured by DIC Corporation), and 62.5 parts by mass thinner were mixed, with which a plastic plate was spray-painted. The obtained spray-painted plate was set at room temperature for 10 minutes and thereafter the spray-painted plate was heated at 50° C. for 20 minutes so as to cure the film. The obtained painted plates (subjected to colorimetry with a method similar to the above-described method in advance) were immersed in 0.1 N sodium hydroxide aqueous solution and 0.1 N sulfuric acid aqueous solution at 55° C. for 4 hours, respectively. Thereafter, the painted plate was washed with water and then dried, followed by colorimetry with the method above, so as to find color difference of the film before and after immersion. Evaluation as "excellent" was made when $\Delta E^*_{45}$ was lower than 3, evaluation as "satisfactory" was made when $\Delta E^*_{45}$ was not lower than 3 and lower than 7, and evaluation as "unsatisfactory" was made when $\Delta E^*_{45}$ was 7 or higher.

<Water Resistance Test>

The painted plate obtained with the "method of fabricating a painted plate" above was immersed in a bath held at 40° C. for 10 days. Thereafter, gloss retention, color difference and adhesion of the film were evaluated. It is noted that this water resistance test is conducted for evaluating water (moisture) resistance herein.

(1) Gloss Retention

Regarding gloss of the film, glossiness of 20 was measured with a glossimeter (Gloss Meter VG2000 manufactured by Nippon Denshoku Industries Co., Ltd.). Denoting a measurement value of glossiness of 20 of the painted plate before immersion as G1 and denoting a measurement value of glossiness of 20 of the painted plate after immersion as G2, gloss retention R was calculated as shown in the equation below.

$$R(\%) = (G2/G1) \times 100$$

Evaluation as "excellent" was made when R was not lower than 90%, evaluation as "satisfactory" was made when R was not lower than 80% and lower than 90%, and evaluation as "unsatisfactory" was made when R was lower than 80%.

(2) Color Difference $\Delta E^*_{45}$ before and after immersion above, of the painted plate obtained with the "method of fabricating a painted plate" above was found with the colorimetry method above. Evaluation as "excellent" was made when $\Delta E^*_{45}$ was lower than 3, evaluation as "satisfactory" was made when $\Delta E^*_{45}$ was not lower than 3 and lower than 7, and evaluation as "unsatisfactory" was made when $\Delta E^*_{45}$ was 7 or higher.

(3) Adhesion

Regarding the painted plate obtained with the "method of fabricating a painted plate" above, a checkerboard-shaped cut having a width of 2 cm and a length of 2 cm was made at 2-mm interval on the film of the painted plate after immersion above, Sellotape® (CT-24 manufactured by Nichiban Co., Ltd.) was adhered to the film and pulled at an angle of 45 degrees, and a degree of peel-off of the checkerboard-shaped portion above of the film (metallic pigment particle) was visually observed. In accordance with the observation results, evaluation as "excellent" was made when there was no peel-off; evaluation as "satisfactory" was made when there was slight peel-off, and evaluation as "unsatisfactory" was made when there was peel-off.

Example 1

Initially, paste of aluminum particles in a flake shape serving as the base particles (trade name 5422NS, particle size: 19 μm, pasting agent: mineral spirit, manufactured by TOYO Aluminium K.K.) was washed with mineral spirit and then filtered. A non-volatile component (aluminum particle) of the filtered paste was 74 mass % (the remainder was mineral spirit).

In a 3-liter separable flask, 1500 g mineral spirit was added to 405.4 g paste (in which non-volatile component occupied 300 g), followed by stirring, to thereby obtain slurry. After stirring was continued and the system was purged with a nitrogen gas to attain a nitrogen atmosphere, a temperature was raised to 80° C. The following operation was performed while the present condition was maintained, unless otherwise specified.

Then, 0.5 g acrylic acid (denotation "A" in Table 1), 3.0 g epoxidized 1,2-polybutadiene (denotation "B" in Table 1) diluted to 50 mass % with mineral spirit, 1.5 g divinylbenzene (denotation "C" in Table 1), 9.8 g trimethylolpropane triacrylate (denotation "D" in Table 1), and 1.6 g azo bis isobutyronitrile (AIBN) were added to the slurry above. After the monomer above and AIBN were added, reaction for 3 hours was caused (the outermost layer formation step).

Thereafter, 3.0 g lauryl methacrylate (denotation "E" in Table 1) (corresponding to 1 part by mass with respect to 100 parts by mass non-volatile component (aluminum particles) that serves as the surface modifier and 0.5 g AIBN were successively added to the slurry above, followed by further reaction for 5 hours (the surface modifier treatment step). After cooling to end reaction, filtering and washing with a small amount of mineral spirit was performed, to thereby obtain the resin-coated metallic pigment according to the present invention in a state of paste (solid content: 70 mass %). With the obtained resin-coated metallic pigment, the water base paint was prepared with the method above, and the pigment was subjected to chemical resistance tests and water resistance tests. Table 2 shows the results.

TABLE 1

| Denotation | Chemical Name | The Number of Polymeric Double Bonds | Remarks |
|---|---|---|---|
| A | Acrylic Acid | 1 | |
| B | Epoxidized 1,2-Polybutadiene | Approximately 10 | Oligomer |
| C | Divinylbenzene | 2 | |
| D | Trimethylolpropane Triacrylate | 3 | |
| E | Lauryl Methacrylate | 1 | Surface Modifier |
| F | Glycidyl Methacrylate | 1 | Surface Modifier |
| G | Dimethyl Amino Ethyl Methacrylate | 1 | Surface Modifier |
| H | Diethyl Amino Ethyl Acrylate | 1 | Surface Modifier |
| I | 2-Ethylhexyl Acrylate | 1 | Surface Modifier |
| J | Hydroxyethyl Acrylate | 1 | Surface Modifier |

"The number of polymeric double bonds" in Table 1 indicates the number of polymeric double bonds per individual monomer or individual oligomer. Thus, it is assumed in the present invention that the number of polymeric double bonds refers to the number thereof per individual monomer or individual oligomer.

TABLE 2

| | | | | | Chemical Resistance Test | | Water Resistance Test | | |
| | | Outermost | Surface Modifier | Acid | Alkali | Gloss | Color | |
| | Base Particle | Layer | Type | Amount* | Resistance | Resistance | Retention | Difference | Adhesion |
|---|---|---|---|---|---|---|---|---|---|
| Example 1 | Aluminum Particle | A-B-C-D | E | 1 | Excellent | Excellent | Excellent | Excellent | Excellent |
| Example 2 | Aluminum Particle | A-B-C-D | F | 1 | Excellent | Excellent | Excellent | Excellent | Excellent |
| Example 3 | Aluminum Particle | A-B-C-D | G | 1 | Excellent | Excellent | Excellent | Excellent | Excellent |
| Example 4 | Aluminum Particle | A-B-C-D | H | 1 | Excellent | Excellent | Excellent | Excellent | Excellent |
| Example 5 | Aluminum Particle | A-B-C-D | I | 1 | Excellent | Excellent | Excellent | Excellent | Excellent |
| Example 6 | Aluminum Particle | A-B-C-D | J | 1 | Excellent | Excellent | Excellent | Excellent | Excellent |
| Example 7 | Aluminum Particle | A-B-C-D | E | 0.05 | Excellent | Excellent | Satisfactory | Satisfactory | Excellent |
| Example 8 | Aluminum Particle | A-B-C-D | E | 0.2 | Excellent | Excellent | Excellent | Excellent | Excellent |
| Example 9 | Aluminum Particle | A-B-C-D | E | 5 | Excellent | Excellent | Excellent | Excellent | Excellent |
| Example 10 | Aluminum Particle | A-B-C-D | E | 15 | Excellent | Excellent | Excellent | Excellent | Satisfactory |
| Example 11 | Aluminum Particle | A-C-D | E | 1 | Excellent | Excellent | Excellent | Excellent | Excellent |
| Example 12 | Colored Aluminum Particle | A-B-C-D | E | 1 | Excellent | Excellent | Excellent | Excellent | Excellent |
| Example 13 | Interference Color Aluminum Particle | A-B-C-D | E | 1 | Excellent | Excellent | Excellent | Excellent | Excellent |
| Example 14 | Stainless Particle | A-B-C-D | E | 1 | Excellent | Excellent | Excellent | Excellent | Excellent |
| Example 15 | Alumina Particle | A-B-C-D | E | 1 | Excellent | Excellent | Excellent | Excellent | Excellent |
| Example 16 | Mica Particle | A-B-C-D | E | 1 | Excellent | Excellent | Excellent | Excellent | Excellent |
| Comparative Example 1 | Aluminum Particle | A-B-C-D | — | 0 | Excellent | Excellent | Unsatisfactory | Satisfactory | Satisfactory |
| Comparative Example 2 | Aluminum Particle | A-B-C-D-E | — | 0 | Excellent | Excellent | Unsatisfactory | Satisfactory | Satisfactory |
| Comparative Example 3 | Aluminum Particle | A-C-D | — | 0 | Excellent | Excellent | Unsatisfactory | Satisfactory | Satisfactory |
| Comparative Example 4 | Aluminum Particle | — | — | 0 | Unsatisfactory | Unsatisfactory | Excellent | Satisfactory | Excellent |

*Amount: Part(s) by mass, assuming parts by mass of a non-volatile component as 100

Examples 2 to 6

In Examples 2 to 6, treatment similar to that in Example 1 was otherwise performed except that 3.0 g (1 part by mass with respect to 100 parts by mass non-volatile component) glycidyl methacrylate (denotation "F" in Table 1), dimethyl amino ethyl methacrylate (denotation "G" in Table 1), diethyl amino ethyl acrylate (denotation "H" in Table 1), 2-ethylhexyl acrylate (denotation "I" in Table 1), and hydroxyethyl acrylate (denotation "J" in Table 1) were used as the surface modifiers, respectively, to thereby obtain the resin-coated metallic pigments according to the present invention in a state of paste. The obtained resin-coated metallic pigments were subjected to chemical resistance tests and water resistance tests as in Example 1, and Table 2 shows the results.

Examples 7 to 10

In Examples 7 to 10, treatment similar to that in Example 1 was otherwise performed except that amounts of addition of lauryl methacrylate (denotation "E" in Table 1) serving as the surface modifier were set to 0.15 g, 0.6 g, 15 g, and 45 g (0.05, 0.2, 5, and 15 parts by mass with respect to 100 parts by mass non-volatile component (aluminum particles)), respectively, to thereby obtain the resin-coated metallic pigments according to the present invention in a state of paste. The obtained resin-coated metallic pigments were subjected to chemical resistance tests and water resistance tests as in Example 1, and Table 2 shows the results.

Example 11

Slurry for performing the outermost layer formation step was prepared as in Example 1.

Then, 0.5 g acrylic acid (denotation "A" in Table 1), 3.0 g divinylbenzene (denotation "C" in Table 1), 9.8 g trimethylolpropane triacrylate (denotation "D" in Table 1), and 1.6 g azo bis isobutyronitrile (AIBN) were added to the slurry prepared above. After the monomer above and AIBN were added, reaction for 3 hours was caused (the outermost layer formation step).

Thereafter, 3.0 g lauryl methacrylate (denotation "E" in Table 1) (1 part by mass with respect to 100 parts by mass non-volatile component (aluminum particles)) that serves as the surface modifier and 0.5 g AIBN were successively added to the slurry above, followed by further reaction for 5 hours (the surface modifier treatment step). After cooling to end reaction, filtering and washing with a small amount of mineral spirit was performed, to thereby obtain the resin-coated metallic pigment according to the present invention in a state of paste. The obtained resin-coated metallic pigment was subjected to chemical resistance tests and water resistance tests as in Example 1 and Table 2 shows the results.

Examples 12 to 16

In Examples 12 to 16, treatment similar to that in Example 1 was otherwise performed except that colored aluminum particles in a flake shape (obtained by subjecting aluminum flakes manufactured by TOYO Aluminium K.K. (trade name 5422NS, particle size: 19 μm) to coloring treatment in advance with a method in conformity with Example 1 in Japanese Patent Laying-Open No. 9-124973), interference color aluminum particles (obtained by subjecting aluminum flakes manufactured by TOYO Aluminium K.K. (trade name 5422NS, particle size: 19 μm) to interference-color coloring treatment in advance with a method in conformity with Example 1 in WO2007/094253), stainless particles in a flake shape (commercially available product, particle size: 20 μm, corresponding to metal particles), alumina particles in a flake shape (commercially available product, particle size: 6 μm, corresponding to inorganic compound particles), and mica particles in a flake shape (commercially available product, particle size: 15 μm, corresponding to inorganic compound particles) were used as the base particles, respectively, to thereby obtain the resin-coated metallic pigments according to the present invention in a state of paste. The obtained resin-coated metallic pigments were subjected to chemical resistance tests and water resistance tests as in Example 1, and Table 2 shows the results.

Comparative Example 1

Treatment similar to that in Example 1 was otherwise performed except that the surface modifier treatment step was not performed in Example 1, to thereby obtain the resin-coated metallic pigment in a state of paste. The obtained resin-coated metallic pigment was subjected to chemical resistance tests and water resistance tests as in Example 1, and Table 2 shows the results. The present Comparative Example corresponds to an example where only the outermost layer formation step was performed to manufacture the resin-coated metallic pigment.

Comparative Example 2

Slurry for performing the outermost layer formation step was prepared as in Example 1.

Then, 0.5 g acrylic acid (denotation "A" in Table 1), 3.0 g epoxidized 1,2-polybutadiene (denotation "B" in Table 1) diluted to 50 mass % with mineral spirit, 1.5 g divinylbenzene (denotation "C" in Table 1), 9.8 g trimethylolpropane triacrylate (denotation "D" in Table 1), 3.0 g lauryl methacrylate (denotation "E" in Table 1, added not as the surface modifier but as one monomer forming the outermost layer in the present Comparative Example), and 1.6 g azo his isobutyronitrile (AIBN) were added to the slurry prepared above. After the monomer and AIBN were added, reaction for 8 hours was caused. After cooling to end reaction, filtering and washing with a small amount of mineral spirit was performed, to thereby obtain the resin-coated metallic pigment in a state of paste (the outermost layer formation step). The obtained resin-coated metallic pigment was subjected to chemical resistance tests and water resistance tests as in Example 1 and Table 2 shows the results. The present Comparative Example also corresponds to an example where only the outermost layer formation step was performed to manufacture the resin-coated metallic pigment.

Comparative Example 3

Slurry for performing the outermost layer formation step was prepared as in Example 1.

Then, 0.5 g acrylic acid (denotation "A" in Table 1), 3.0 g divinylbenzene (denotation "C" in Table 1), 9.8 g trimethylolpropane triacrylate (denotation "D" in Table 1), and 1.6 g azo bis isobutyronitrile (AIBN) were added to the slurry prepared above. After the monomer and AIBN were added, reaction for 8 hours was caused. After cooling to end reaction, filtering and washing with a small amount of mineral spirit was performed, to thereby obtain the resin-coated metallic pigment in a state of paste (the outermost layer formation step). The obtained resin-coated metallic pigment was subjected to chemical resistance tests and water resistance tests as in Example 1 and Table 2 shows the results. The present Comparative Example also corresponds to an example where only the outermost layer formation step was performed to manufacture the resin-coated metallic pigment.

Comparative Example 4

Commercially available metallic pigment paste which is paste of aluminum particles in a flake shape (trade name 5422NS, particle size: 19 μm, manufactured by TOYO Aluminium K.K.) was subjected to chemical resistance tests and water resistance tests as in Example 1 and Table 2 shows the results. The present Comparative Example corresponds to the base particle itself without being subjected to the outermost layer formation step and the surface modifier treatment step.

Based on the results shown in Table 2, the resin-coated metallic pigment in each Example having the feature of the present invention achieved results better in both of chemical resistance and water resistance than the resin-coated metallic pigment of which surface portion of the outermost layer was not treated with the surface modifier or the metallic pigment without resin coating in each Comparative Example. This result was also shown in any of the examples where the type of the surface modifier was changed (Examples 2 to 6), the examples where an amount of addition of the surface modifier was changed (Examples 7 to 10), the example where the type of the monomer or the oligomer for the outermost layer was changed (Example 11), and the examples where the type of the base particle was changed (Examples 12 to 16).

Therefore, according to the resin-coated metallic pigment of the present invention, the film achieving both chemical resistance and water resistance can clearly be obtained.

Though the embodiments and the examples of the present invention have been described as above, combination of the features in each embodiment and example described above as appropriate is originally intended.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

According to the present invention, a resin-coated metallic pigment achieving water (moisture) resistance of an obtained film improved to a level sufficient for practical use when the resin-coated metallic pigment is blended in a water base paint with chemical resistance of the film containing the pigment being maintained, a water base paint containing the same, a coated product to which the water base paint has been applied, and a method of manufacturing the resin-coated metallic pigment can be provided.

The invention claimed is:

1. A resin-coated metallic pigment comprising a base particle having a coating layer constituted of a single layer or a plurality of layers formed on its surface, an outermost layer of said coating layer being composed of a resin which is a polymer containing one or more compound selected from a monomer and an oligomer having two or more polymerizable double bonds as constituent unit, and a surface portion of said outermost layer being treated with a surface modifier which is a compound having one polymerizable double bond, said surface modifier being bonded in an interspersed manner at the surface portion of the outermost layer so as not to form a layer thereon.

2. The resin-coated metallic pigment according to claim 1, wherein said surface modifier is an ester of an unsaturated carboxylic acid.

3. The resin-coated metallic pigment according to claim 1, containing said surface modifier at a ratio of 0.1 to 10 parts by mass with respect to 100 parts by mass of said base particle.

4. The resin-coated metallic pigment according to claim 1, wherein said base particle is an aluminum particle.

5. The resin-coated metallic pigment according to claim 1, wherein said base particle is a colored aluminum particle to which surface an inorganic pigment or an organic pigment is adhered.

6. The resin-coated metallic pigment according to claim 1, wherein said base particle is an interference color aluminum particle in which one or more inorganic compound layers or metal layers exhibiting an interferential action is formed on a surface of an aluminum particle.

7. The resin-coated metallic pigment according to claim 1, used for a water base paint.

8. A water base paint containing the resin-coated metallic pigment according to claim 1.

9. A coated product to which the water base paint according to claim 8 has been applied.

10. The resin-coated metallic pigment according to claim 1, wherein the base particle is a metal particle selected from the group consisting of aluminum, zinc, copper, bronze, nickel, titanium and stainless steel.

11. The resin-coated metallic pigment according to claim 1, wherein the base particle is an inorganic compound selected from the group consisting of glass, mica, alumina and titania.

12. The resin-coated metallic pigment according to claim 1, wherein the base particle has an average particle size of 1 to 100 μm.

13. The resin-coated metallic pigment according to claim 1, where the base particle has a flake shape with an average thickness of 0.005 μm to 5 μm.

14. A method of manufacturing a resin-coated metallic pigment including a base particle having a coating layer constituted of a single layer or a plurality of layers formed on its surface, comprising the steps of:
    forming on the surface of said base particle, an outermost layer of said coating layer by polymerizing one or more compounds selected from a monomer and an oligomer having two or more polymerizable double bonds; and
    treating a surface portion of said outermost layer with a surface modifier which is a compound having one polymerizable double bond, said surface modifier being bonded in an interspersed manner at the surface portion of the outermost layer so as not to form a layer thereon.

15. The method of manufacturing a resin-coated metallic pigment according to claim 14, wherein in said step of treating with a surface modifier, said surface modifier is bonded to the surface portion of said outermost layer as a result of reaction of the polymerizable double bond remaining at the surface portion of said outermost layer and the polymerizable double bond contained in said surface modifier.

* * * * *